United States Patent
Faotto

(10) Patent No.: US 11,192,332 B2
(45) Date of Patent: Dec. 7, 2021

(54) BACKING LAYER OF A THERMAL INSULATION PANEL FOR BUILDING HAVING INCREASED ADHESION PROPERTIES TO AN INSULATING LAYER

(71) Applicant: SILCART S.p.A., Treviso (IT)

(72) Inventor: Ugo Faotto, Treviso (IT)

(73) Assignee: SILCART S.p.A., Treviso (IT)

( * ) Notice: Subject to any disclaimer, the term of this patent is extended or adjusted under 35 U.S.C. 154(b) by 76 days.

(21) Appl. No.: 15/546,621

(22) PCT Filed: Jan. 19, 2016

(86) PCT No.: PCT/IB2016/050243
§ 371 (c)(1),
(2) Date: Jul. 26, 2017

(87) PCT Pub. No.: WO2016/120749
PCT Pub. Date: Aug. 4, 2016

(65) Prior Publication Data
US 2017/0368792 A1 Dec. 28, 2017

(30) Foreign Application Priority Data

Jan. 27, 2015 (IT) .......................... MI2015A000087

(51) Int. Cl.
| | |
|---|---|
| *B32B 5/26* | (2006.01) |
| *B32B 5/20* | (2006.01) |
| *B32B 5/28* | (2006.01) |
| *B32B 5/18* | (2006.01) |
| *B32B 9/04* | (2006.01) |
| *B32B 19/00* | (2006.01) |
| *E04B 1/94* | (2006.01) |
| *E04B 1/80* | (2006.01) |
| *C04B 14/00* | (2006.01) |
| *E04C 2/24* | (2006.01) |
| *B32B 5/24* | (2006.01) |
| *E04B 1/76* | (2006.01) |

(52) U.S. Cl.
CPC .................. *B32B 5/26* (2013.01); *B32B 5/18* (2013.01); *B32B 5/20* (2013.01); *B32B 5/245* (2013.01); *B32B 5/28* (2013.01); *E04B 1/7608* (2013.01); *E04B 1/80* (2013.01); *E04B 1/942* (2013.01); *E04C 2/243* (2013.01); *E04C 2/246* (2013.01); *B32B 2255/02* (2013.01); *B32B 2255/26* (2013.01); *B32B 2260/021* (2013.01); *B32B 2260/023* (2013.01); *B32B 2260/046* (2013.01); *B32B 2266/0278* (2013.01); *B32B 2307/304* (2013.01); *B32B 2419/00* (2013.01); *E04B 2103/04* (2013.01)

(58) Field of Classification Search
None
See application file for complete search history.

(56) References Cited

U.S. PATENT DOCUMENTS

| | | | | |
|---|---|---|---|---|
| 5,112,678 | A * | 5/1992 | Gay | B29C 67/248 427/372.2 |
| 6,774,071 | B2 * | 8/2004 | Horner, Jr. | E04B 1/80 442/136 |
| 2008/0160301 | A1 * | 7/2008 | Nandi | B01F 3/1214 428/363 |
| 2014/0234563 | A1 * | 8/2014 | Bone | B32B 7/12 428/41.8 |
| 2015/0040503 | A1 * | 2/2015 | Tackett | E04D 11/02 52/309.4 |

FOREIGN PATENT DOCUMENTS

| | | |
|---|---|---|
| EP | 2 404 749 A1 | 1/2012 |
| WO | 2013/098781 A2 | 7/2013 |

OTHER PUBLICATIONS

International Search Report and Written Opinion of the International Searching Authority for corresponding International Patent Application No. PCT/IB2016/050243 dated Apr. 18, 2016, 8 pages.

* cited by examiner

*Primary Examiner* — Sheeba Ahmed
(74) *Attorney, Agent, or Firm* — Merchant & Gould P.C.

(57) ABSTRACT

A backing layer (10) of a multilayer thermal insulation panel (100) for building constructions includes a glass fiber reinforcement layer (1) having a first surface (F1) and an opposite second surface (F2). The reinforcement layer is interposed between a first coating layer (2) attached to the first surface (F1) of the reinforcement layer and a second coating layer (3) attached to the second surface (F2) of the reinforcement layer (1). The first (2) and second (3) coating layers are manufactured by a mixture including an organic binder.

14 Claims, 1 Drawing Sheet

BACKING LAYER OF A THERMAL INSULATION PANEL FOR BUILDING HAVING INCREASED ADHESION PROPERTIES TO AN INSULATING LAYER

This application is a National Stage Application of PCT/IB2016/050243, filed 19 Jan. 2016, which claims benefit of Serial No. MI2015A000087, filed 27 Jan. 2015 in Italy and which applications are incorporated herein by reference. To the extent appropriate, a claim of priority is made to each of the above disclosed applications.

TECHNOLOGICAL BACKGROUND OF THE INVENTION

Field of Application

The present invention relates to a backing layer of a multilayer thermal insulation panel for building constructions. In particular, the invention relates to a backing layer of an insulating panel having increased properties of adhesion to an insulating layer of the panel.

Prior Art

Due to energy saving reasons, the need is increasingly felt in the field of construction to thermally insulate buildings in order to promote good heat diffusion in rooms while avoiding the dispersion thereof outside. To this end, multilayer insulating panels are widely used in building constructions, for example to thermally insulate walls, floors and roofs. Such insulating panels generally comprise a thermal insulation layer, e.g. made of expanded polyurethane, interposed between two respective backing layers or backings adapted to cover the insulating layer. Such backing layers serve a double purpose: on the one side, they contain the expansion of the polyurethane foam and on the other, they give the panels themselves a predetermined shape and thickness while ensuring the dimensional stability of the panels.

Flexible backing elements for panels are known and widely used, comprising one or more layers, which in particular include a reinforcement layer made of fibrous material, e.g. made of glass fiber.

In greater detail, such backings for insulating panels are made so that during the manufacturing of the panel, one of the two opposite surfaces of the glass fiber reinforcement layer is placed in direct contact with the expanded polyurethane foam of the insulating layer.

Drawbacks which cannot be ignored thus may arise when manufacturing the insulating panel, caused by the incompatibility both in structural and chemical terms between such a surface of the glass fiber reinforcement layer and a respective surface of the polyurethane insulating layer in contact with the reinforcement layer.

One example of structural incompatibility is given by the rough structure of the glass fiber which forms the reinforcement causing a reduction in adhesion between the surface of the reinforcement layer of the backing with the respective surface of the insulating layer.

In terms of chemical incompatibility, the adhesion between the backing and the insulating layer also may be reduced due to binding chemical agents (generally referred to as "binders" by those skilled in the art) incorporated in the glass fiber reinforcement layer. Indeed, such a binder which materializes in an acrylic, melamine binder, or a urea formaldehyde-based binder, for example, is often chemically incompatible with the composition of the polyurethane foam of the insulating layer. Moreover, the binder may release pollutants over time, such as e.g. formaldehyde, inside the building insulated by the panels, albeit in small amounts.

We cannot neglect that once the backing for the insulating panel has been made, the glass fiber forming the reinforcement often remains exposed and subject to manipulation by individuals appointed with the task of manufacturing the insulating panel and/or installing the panels during the construction step. In addition to being difficult to handle, the glass fiber layer may create drawbacks for operators due to the possible dispersion of the fibers generated by mechanical actions exerted on the backings. Indeed, such dispersed fibers may cause irritations.

SUMMARY OF THE INVENTION

Therefore, it is the object of the present invention to devise and provide a backing layer of thermal insulation panels for building constructions, which allows the above-indicated drawbacks associated with using backings of known type which include, in particular, a glass fiber reinforcement layer, to be at least partly resolved.

BRIEF DESCRIPTION OF THE DRAWINGS

Further features and advantages of the backing layer of a thermal insulation panel according to the invention will become apparent from the following description of preferred embodiments thereof, given only by way of a non-limiting, indicative example, with reference to the accompanying drawings, in which.

In the aforesaid figures, equal or similar elements are indicated with the same numerals.

DETAILED DESCRIPTION

Figure 1:
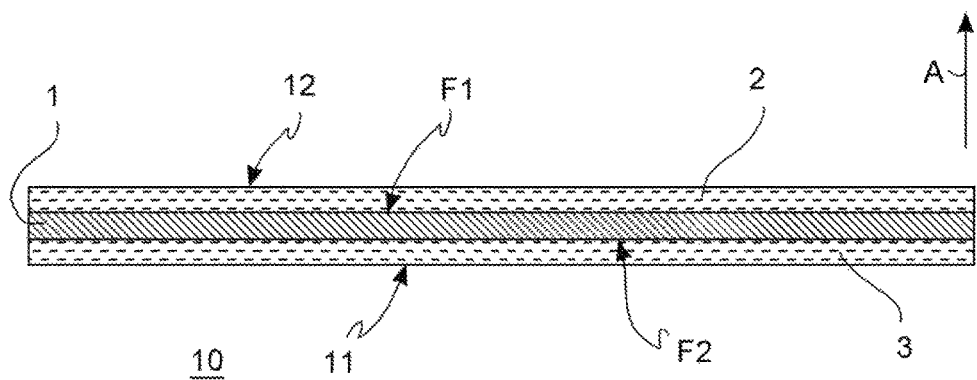
FIG. 1 shows a diagrammatic enlarged view of a cross section of a backing layer of a thermal insulation panel for building constructions, in accordance with the present invention.
Figure 2:
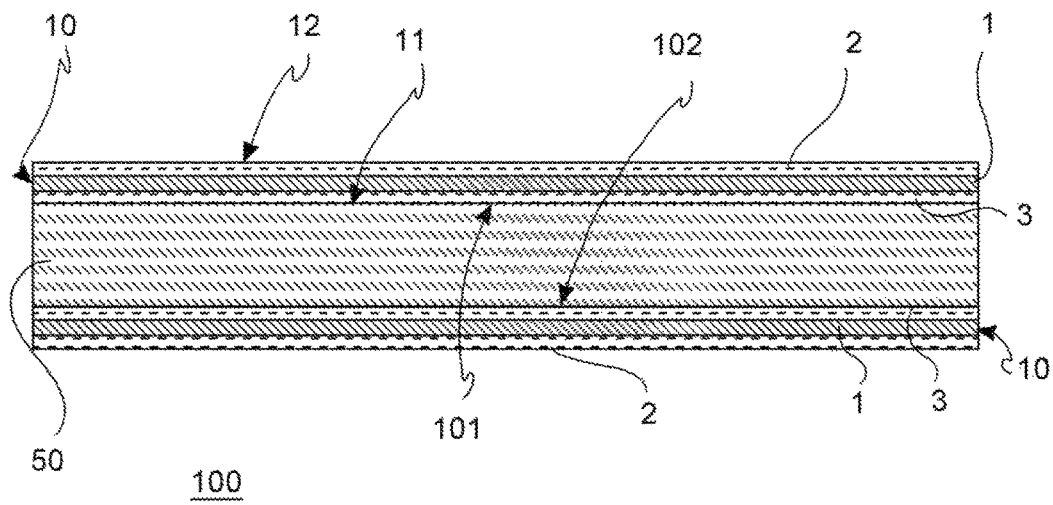
FIG. 2 diagrammatically shows a cross section of a multilayer thermal insulation panel for building constructions, including two backing layers of the present invention.

Referring to FIGS. 1-2, a backing layer, or flexible backing, of a multilayer thermal insulation panel 100 for building constructions in accordance with the invention is indicated with numeral 10.

Such an insulating panel 100 can be used in the construction field for covering walls (both vertical and horizontal walls), floors and roofs to increase the thermal insulation thereof.

Such an insulating panel 100 comprises a central body 50 consisting of an expanded insulation with cellular structure, e.g. expanded polyurethane (PUR) or expanded polyisocyanurate (PIR), phenolic foam or polystyrene (PS).

In the exemplary embodiment shown in FIG. 2, such a central body 50 of the panel 100 is interposed or sandwiched between two similar backing layers 10 of the invention.

Such flexible backing layers 10 are configured to contain the expansion of the polyurethane foam during the manufacturing steps of the panel 100. Moreover, the backing layers 10 are adapted to give the panels 100 a predetermined shape and thickness thus simultaneously ensuring dimensional stability, flatness and protection of the panels. Moreover, such backings 10 keep the insulating material dry and extend the insulating capacities of panel 100.

Each of the aforesaid backing layers or backings 10 comprises a glass fiber reinforcement layer 1 having a first surface F1 and an opposite second surface F2. In one embodiment, the reinforcement layer 1 of backing 10 consists of a woven or non-woven fabric of glass fiber. In another embodiment, the reinforcement layer 1 of backing 10 consists of a glass fiber mesh.

Moreover, the reinforcement layer 1 of the backing 10 is interposed between a first coating layer 2 attached, i.e. fixed in contact with and caused to adhere, to the first surface F1 of the reinforcement layer and a second coating layer 3 of the backing attached, i.e. fixed in contact with and caused to adhere, to the second surface F2 of the reinforcement layer 1.

Referring to the example in FIG. 1 in which arrow A indicates a direction of extension of the backing 10, the first coating layer 2 depicts an upper coating layer of reinforcement 1, i.e. a layer directly applied to the first surface F1 which extends, starting from the first surface F1, in the direction indicated by arrow A. The second coating layer 3 is a lower coating layer of reinforcement 1 directly applied to the second surface F2, i.e. which extends starting from the second surface F2 in direction opposite to the one indicated by arrow A. In other words, the reinforcement layer 1 is interposed between the first 2 and second 3 coating layers.

It is worth noting that in the backing layer 10 of the invention, the first 2 and second 3 coating layers of the reinforcement layer 1 are configured to completely incorporate the glass fiber woven fabric, or the glass fiber non-woven fabric, or the glass fiber mesh, by advantageously acting as a shield for a binder included in the glass fiber.

Such a shielding effect in particular reduces the undesired effects of chemical incompatibility between the insulating layer 50 and the binder itself, thus promoting the adhesion between the flexible backing 10 and the insulating layer 50, e.g. the polyurethane insulating layer. Moreover, any undesired effects of the backings of known type caused by the release of pollutants by the binder are also substantially inhibited with the backing 10 of the invention.

In accordance with a general embodiment, the aforesaid first 2 and second 3 coating layers comprise a mixture comprising an organic binder.

In a more specific embodiment, the mixture of the aforesaid first 2 and second 3 coating layers comprises inorganic mineral fillers in addition to the organic binder.

In an even more specific embodiment, the mixture of the aforesaid first 2 and second 3 coating layers comprises a thickener, e.g. modified cellulose, starches, polyethers, and water in addition to the organic binder alone, or in addition to the mixture between the organic binder and the inorganic mineral fillers.

It is worth noting that the mixture comprising the organic binder with possibly the addition of mineral fillers, thickener and water, allows the coating layers 2, 3 which promote the adhesion between the flexible backing 10 and the insulating layer 50 of panel 100, to be made.

In an even more particular embodiment, in addition to the above-indicated components, the mixture forming the aforesaid first 2 and second 3 coating layers may comprise additives, e.g. water-repellent or hydrophilic additives, oleophobic or oleophilic additives, and/or flame-retardant, reinforcing, elasticizing, levelling additives, antimicrobials, biocides.

In one embodiment, the first 2 and second 3 coating layers of the backing 10 are similar to each other.

In another embodiment, the first 2 and second 3 coating layers of the backing 10 may have different compositions and properties from each other. In particular, the first coating layer 2 may differ from the second coating layer 3 because the respective mixtures use organic binders and inorganic mineral fillers of different types. In particular, the first coating layer 2 comprises a first mixture comprising a first organic binder and a first type of inorganic mineral fillers, the second coating layer 3 comprises a second mixture comprising a second organic binder, different from the first organic binder, and a second type of inorganic mineral fillers, different from the first type of inorganic mineral fillers of the first mixture.

Moreover, the coating layers 2, 3 may differ from each other also based on different additives included in the respective mixtures and based on various surface treatments to which they are subjected in relation to the function they perform. For example, referring to FIG. 2, the second coating layer 3 in contact with the insulating foam may be advantageously manufactured so as to have greater properties of compatibility and adhesion with such an insulating foam. The first coating layer 2, which depicts an outer layer of panel 100, instead may be advantageously manufactured so as to have greater properties of fire resistance or water repellency.

In one embodiment, the organic binder of the mixture is selected from the group consisting of: acrylic resins, styrene resins, polyurethane resins, vinyl resins, ethylene vinyl acetate (EVA), polyethylene resins, versatic resins, i.e. a resin including vinyl versatate, or from the group consisting of any one combination and/or copolymers of the above-indicated resins.

In one embodiment, the inorganic mineral fillers of the mixture are selected from the group consisting of: carbonates, silicates, oxides, hydroxides, borates, sulfates.

In accordance with one embodiment, the flexible backing layer 10 for insulating panels has a thickness ranging from about 0.2 mm to 1 mm and a weight per square meter of surface (grammage) ranging from about 150 $g/m^2$ to 800 $g/m^2$.

In an exemplary non-limiting embodiment, assuming that the first 2 and second 3 coating layers are similar to each other, such coating layers comprise a same mixture, which comprises:

an acrylic resin, in a percentage ranging from 2% to 20%;
inorganic mineral fillers, in a percentage ranging from 50% to 80%;
a thickener, in a percentage ranging from 0.1% to 20%;
water, in a percentage ranging from 10% to 30%.

Embodiments of the method for manufacturing the backing layer 10 of the insulating panel 100 are described below, in which the first 2 and second 3 coating layers of the reinforcement 1 are made starting from the mixture comprising the organic binder, e.g. acrylic resin, and also the inorganic mineral fillers, the thickener and water.

In a first example of the method for manufacturing the backing layer 10, the use is provided of a roll-to-roll type processing apparatus (not shown in the figures) having an inlet towards which the glass fiber reinforcement layer 1 is fed.

Within such an apparatus, the method comprises a first step of distributing the above-described mixture at the fluid state on top of the first surface F1 of the reinforcement 1 to form the first coating layer 2. It is worth noting that such a distribution step is implemented, for example, in a step of spreading the fluid mixture on top of the first surface F1 of the reinforcement 1.

The method then provides a step of drying the semi-finished backing 10 thus obtained a first time, e.g. in a hot air furnace. Such a first drying allows the resin of the first coating layer 2 to be dried and plasticized, i.e. reticulated, to cause it to adhere to the reinforcement layer 1.

The backing 10 thus obtained is made available to a respective outlet of the processing apparatus.

The method then provides overturning the backing 10, e.g. manually by an operator, to make it available again to the inlet of the processing apparatus.

At this point, the method continues with a second step of distributing the fluid mixture at the second surface F2 of reinforcement 1 to form the second coating layer 3 of the reinforcement layer 1.

The method then provides a step of drying the backing 10 thus obtained a second time, e.g. in a hot air furnace. Such a second drying allows the resin of the second coating layer 3 to be dried and plasticized, i.e. reticulated, to cause it to adhere to the reinforcement layer 1.

The flexible backing 10 obtained at the end of such operations may be rolled to be stored.

In a second example of the method for manufacturing the backing 10, the use is provided of a roll-to-roll processing apparatus in which such rollers are configured to convey the reinforcement 1 of the backing and to overturn it automatically following the completion of the first above-mentioned steps of distributing the fluid mixture and drying. The same apparatus carries out the second step of distributing the fluid mixture and the second drying on the backing thus overturned.

Thereby, the backing 10 is made by means of a single continuous process which has the advantage of not requiring the manual overturning of the semi-finished backing to be provided again at the inlet of the apparatus in order to complete the processing.

As indicated above, in the two above-described examples of the manufacturing method, the mixture forming the first coating layer 2 may be similar to the one used to make the second coating layer 3. Alternatively, the mixture forming the first coating layer 2 differs from the one used to make the second coating layer 3 because such mixtures comprise different organic binders and inorganic mineral fillers of different types.

In a third example of the method for manufacturing the backing 10, a step is provided of distributing the fluid mixture simultaneously on the first F1 and second F2 surfaces of the reinforcement 1. This is obtained in particular by means of immersing the glass fiber reinforcement 1 in a bath containing the aforesaid fluid mixture.

Such a method then provides a step of drying the backing thus obtained, e.g. in a hot air furnace, which simultaneously allows the resin of the first 2 and second 3 coating layers to be dried and plasticized, i.e. reticulated, to cause them to adhere to reinforcement 1.

With respect to the above-described examples of the manufacturing method, the method in this third example has the advantage of requiring a single drying step of the backing 10.

In order to manufacture the insulating panel 100, a first embodiment provides a step of spraying the polyurethane insulating foam between two similar backing layers 10. Such backing layers are adapted to contain the expansion of the polyurethane foam which forms the thermally insulating central body 50.

Referring to FIG. 2, a second embodiment of manufacturing the panel 100 provides laminating the backing layers 10 on respective opposite surfaces 101, 102 of the preformed insulating central body 50 by means of gluing or extruding a polymeric laminating foil. For example, a first side 11, or lower side, of each backing 10 of the invention is glued to the respective surfaces 101, 102 of the insulating central body 50.

Thereby, the backing 10 of the invention can also be applied to insulating panels which do not comprise polyurethane and phenolic foams, but having an insulating central body 50 of fibrous type (e.g. glass wool, rock wool) and natural insulators (e.g. wood wool, cellulose).

In addition to the aforesaid advantages, the backing layer 10 of thermal insulation panels 100 of the invention has several other advantages.

In fact, since the first 2 and second 3 coating layers incorporate the reinforcement layer 1, the glass fibers are encapsulated and withheld by such coatings. Therefore, there is no risk of the detachment of the fibers or the dispersion thereof following mechanical actions exerted on the backings. Any release of chemical substances from the binder of the reinforcement 1 is also limited.

Moreover, the glass fiber, and in particular the related binder, are protected, through the coating layers 2, 3, against aggressive alkaline chemical agents which are present in mortars, cement, top coats used in making the building envelope, and for this reason, often in contact with the insulating panels 100.

In addition, given the presence of the coating layers 2, 3, the first side 11 of the backing layer in contact with the respective surface 101 (or 102) of the insulating foam layer 50 substantially lacks roughness and promotes the running of the foam in the production process of the panels. Contrarily, the glass fiber exposed of the reinforcement in panels of known type creates micro-roughnesses which may limit the running of the expanding polyurethane foam.

Moreover, the Applicant has verified that the adhesion, substantially seamless, between the surface 101 of the insulating layer 50 of panel 100 with the backing 10, which is ensured by the presence of the first side 11 of backing 10, which side is substantially smooth facing the insulation 50, ensures that no micro cavities and channeling are formed at the interface between such a first side 11 and surface 101 (or 102). The absence of such micro cavities and channeling, which could promote the propagation of flames due to the chimney effect if a fire laps the panel at the edge, ensures greater fire resistance of panel 100.

In addition, in the backing layer 10 of the invention, in particular the first side 11, but similar considerations also apply to a second side 12 of the backing relative to the first coating layer 2, they lend themselves to being further processed or treated (with chemical or physical type treatments) in order to promote, and possibly increase, the adhesion and the cohesion of the backing 10 with the insulating foam of panel 100 or to confer other properties.

This is obtained, for example, by adding additives directly into the mixture forming the coating layers 2, 3 or by making additional surface coatings by means of e.g. spraying, spreading, extrusion. These methods, referred to as functionalization by those skilled in the art, also include other treatments, such as e.g. plasma treatments, surface mechanical abrasions, embossing. It is worth noting that the functionalization of one or both of the sides 11, 12 of backing 10 may be used as a treatment for preparing the backing 10 to the adhesion, by means of e.g. hot lamination or gluing, of additional surface coatings, such as e.g. metal sheets or plastic film, at such faces 11, 12 to make a multilayer backing 10.

It is also worth noting that the symmetrical structure of the backing layer 10, in which coating 2, 3 is present on both the surfaces F1, F2 of the reinforcement layer, provides increased mechanical resistance to the stresses and tensions created during the polymerization steps of the insulating foams. Accordingly, this ensures greater dimensional stability of panel 100.

Advantageously, the symmetrical structure of the backing 10 with the coating on both surfaces F1, F2 of the reinforcement layer 1 allows phenomena of coating delamination from the reinforcement layer 1 to be avoided, which phenomena generally may occur in the backings for panels of known type. Indeed, in the backing 10 of the invention, each of the two coatings 2, 3 impregnates the glass fiber reinforcement 1 to such a degree as to cross the thickness in certain points, while firmly adhering to the other coating. One other advantage is represented by the possibility of making backings suitable for various types of insulating foams by working on the formulation/structure of the coatings regardless of the type of glass fiber reinforcement used.

Those skilled in the art may make several changes and adaptations to the above-described embodiments of a backing layer of a thermal insulation panel for building constructions, and may replace elements with others which are functionally equivalent in order to meet contingent needs, without departing from the scope of the following claims. Each of the features described as belonging to a possible embodiment may be achieved irrespective of the other embodiments described.

The invention claimed is:

1. A backing layer of a multilayer thermal insulation panel for building constructions, the thermal insulation panel comprising a central body with an expanded insulating foam, the backing layer comprising:
   a reinforcement layer of glass fiber having a first surface and an opposite second surface;
   a first coating layer of the reinforcement layer, said first coating layer being attached to said first surface;
   a second coating layer of the reinforcement layer attached to said second surface in contact with the insulating foam, the second coating layer comprising an interface with the insulating foam, wherein the interface is free of micro cavities and channeling, said reinforcement layer being interposed between the first coating layer and the second coating layer;
   wherein the first coating layer and the second coating layer encapsulate the glass fiber of the reinforcement layer;
   wherein said first coating layer comprises a first mixture comprising a first organic binder and a first type of inorganic mineral filler; and said second coating layer comprises a second mixture comprising a second organic binder different from the first organic binder and a second type of inorganic mineral filler different from the first type of inorganic mineral filler, wherein the first organic binder and the second organic binder are each selected from the group consisting of acrylic resins, styrene resins, polyurethane resins, vinyl resins, ethylene vinyl acetate (EVA), polyethylene resins, versatic resins, and combinations thereof.

2. The backing layer of a multilayer thermal insulation panel according to claim 1, wherein said first mixture and said second mixture further comprise a thickener and water.

3. The backing layer of a multilayer thermal insulation panel according to claim 1, wherein said first mixture and said second mixture each comprise additives compatible with the insulating foam and adhering to the insulating foam, and wherein said additives of the first mixture and said second mixture comprise additives selected from the group consisting of:
   water-repellent or hydrophilic additives,
   oleophobic or oleophilic additives,
   flame-retardant additives,
   reinforcing, elasticizing, levelling additives, antimicrobials, biocides.

4. The backing layer of a multilayer thermal insulation panel according to claim 1, wherein said inorganic mineral fillers are selected from the group consisting of: carbonates, silicates, oxides, hydroxides, borates, sulfates.

5. The backing layer of a multilayer thermal insulation panel according to claim 1, wherein said backing layer has a thickness ranging from 0.2 mm to 1 mm and a weight per square meter of surface ranging from 150 $g/m^2$ to 800 $g/m^2$.

6. A multilayer thermal insulation panel for building constructions, comprising a central body made of a thermally insulating material sandwiched between two backing layers, each of the backing layers comprising:
   a reinforcement layer of glass fiber having a first surface and an opposite second surface;
   a first coating layer of the reinforcement layer, said first coating layer being attached to said first surface;
   a second coating layer of the reinforcement layer attached to said second surface in contact with the insulating foam, the second coating layer comprising an interface with the insulating foam, wherein the interface is free of micro cavities and channeling;
   said reinforcement layer being interposed between the first coating layer and the second coating layer;
   wherein the first coating layer and the second coating layer encapsulate the glass fiber of the reinforcement layer;
   wherein said first coating layer comprises a first mixture comprising a first organic binder and a first type of inorganic mineral filler; and said second coating layer comprises a second mixture comprising a second organic binder different from the first organic binder and a second type of inorganic mineral filler different from the first type of inorganic mineral filler, wherein the first organic binder and the second organic binder are each selected from the group consisting of acrylic resins, styrene resins, polyurethane resins, vinyl resins, ethylene vinyl acetate (EVA), polyethylene resins, versatic resins, and combinations thereof.

7. A method for manufacturing a backing layer of a multilayer thermal insulation panel for building constructions, the multilayer thermal insulation panel comprising insulating foam, the method comprising in sequence the steps of:
   providing a glass fiber reinforcement layer of the backing, having a first surface and an opposite second surface;
   distributing a first fluid mixture comprising a first organic binder and a first type of inorganic mineral filler on top of the first surface of the reinforcement layer;
   drying the backing a first time to form a first coating layer of the reinforcement layer;
   distributing a second fluid mixture comprising a second organic binder different from the first organic binder, and a second type of inorganic mineral filler, different from the first type of inorganic mineral filler, on top of the second surface of the reinforcement layer and in contact with the insulating foam, wherein the first coating layer and the second coating layer are distributed to encapsulate the glass fiber reinforcement layer;

drying the backing a second time to form a second coating layer of the reinforcement layer, said reinforcement layer being interposed between the first coating layer and the second coating layer;

wherein the second coating layer forms an interface with the insulating foam, wherein the interface is free of micro cavities and channeling;

wherein said first fluid mixture comprises water-repellent or hydrophilic additives; and wherein said first organic binder of the first coating layer is an acrylic resin and said second organic binder of the second coating layer is ethylene vinyl acetate (EVA).

8. The backing layer of a multilayer thermal insulation panel according to claim 1, wherein said mixture of the first coating layer comprises water-repellent or hydrophilic additives; and wherein said mixture of the second coating layer comprises additives having compatibility and adhesion with the insulating foam.

9. The method for manufacturing a backing layer of a multilayer thermal insulation panel according to claim 7, wherein the step of distributing the first fluid mixture comprises distributing a fluid mixture comprising water-repellent or hydrophilic additives; and wherein the step of distributing the second fluid mixture comprises distributing a fluid mixture comprising additives having compatibility and adhesion with the insulating foam.

10. The backing layer of a multilayer thermal insulation panel according to claim 1, wherein said first organic binder is selected from the group consisting of styrene resins, acrylic resins, vinyl resins, and polyurethane resins; and wherein said second organic binder, different from the first organic binder, is selected from the group consisting of styrene resins, polyurethane resins, vinyl resins, and ethylene vinyl acetate (EVA).

11. A multilayer thermal insulation panel comprising the backing layer according to claim 1, wherein the first organic binder comprises styrene resins and the second organic binder comprises ethylene vinyl acetate, the first organic binder comprises acrylic resins and the second organic binder comprises styrene resins, the first organic binder comprises acrylic resins and the second organic binder comprises vinyl resins, the first organic binder comprises styrene resins and the second organic binder comprises vinyl resins, the first organic binder comprises vinyl resins and the second organic binder comprises ethylene vinyl acetate, the first organic binder comprises acrylic resins and the second organic binder comprises polyurethane resins, the first organic binder comprises styrene resins and the second organic binder comprises polyurethane resins, the first organic binder comprises polyurethane resins and the second organic binder comprises ethylene vinyl acetate, or the first organic binder comprises polyurethane resins and the second organic binder comprises vinyl resins.

12. The backing layer of a multilayer thermal insulation panel according to claim 1, wherein said first mixture and said second mixture each comprise additives compatible with the insulating foam and adhering to the insulating foam.

13. The multilayer thermal insulation panel according to claim 6, wherein said first mixture and said second mixture each comprise additives compatible with the insulating foam and adhering to the insulating foam.

14. The method for manufacturing a backing layer of a multilayer thermal insulation panel according to claim 7, wherein said second fluid mixture comprises additives compatible with the insulating foam and adhering to the insulating foam.

* * * * *